W. B. Wadman,
Coal Screen.

Nº 35,642. Patented June 17, 1862.

Witnesses:
J. W. Coombs
R. Gawley

Inventor:
W. B. Wadman
per Munn & Co
Attorneys

UNITED STATES PATENT OFFICE.

W. B. WADMAN, OF BOSTON, MASSACHUSETTS.

IMPROVEMENT IN COAL-SIFTERS.

Specification forming part of Letters Patent No. 35,642, dated June 17, 1862.

*To all whom it may concern:*

Be it known that I, W. B. WADMAN, of Boston, in the county of Suffolk and State of Massachusetts, have invented a new and Improved Coal-Sifter; and I do hereby declare that the following is a full, clear, and exact description of the same, reference being had to the accompanying drawings, forming a part of this specification, in which—

Figure 1:
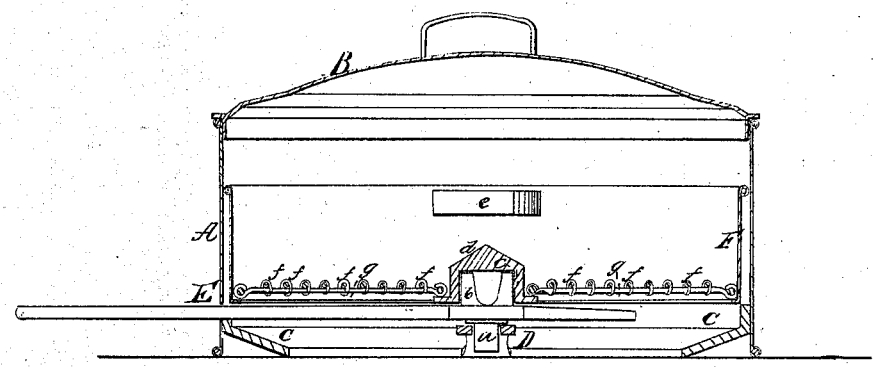
Figure 2:
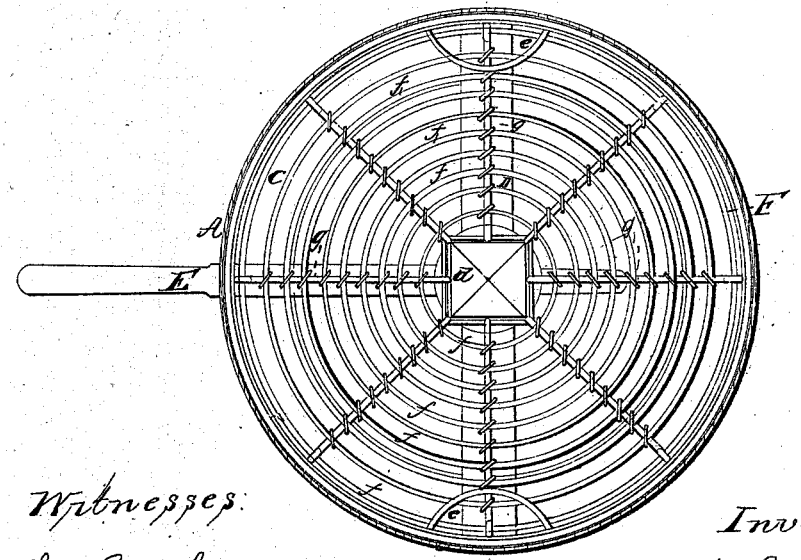

Figure 1 represents a vertical central section of my invention. Fig. 2 is a horizontal section of the same.

Similar letters of reference in both figures indicate corresponding parts.

This invention consists in the arrangement of a rotary cylindrical sieve fitting, by means of a conical center, over a square projection on the upper surface of a handle which oscillates on a pivot projecting from its lower surface, in combination with a barrel or cylinder provided at its bottom with a flaring rim and bridge, forming the socket for the pivot of the handle in such a manner that the coal and ashes which may be thrown into the sieve are conducted by the conical center to the perforated portion of the bottom of said sieve, and that by the combined action of the oscillating handle and flaring rim the operation of sifting the coal is considerably facilitated.

To enable those skilled in the art to make and use my invention, I will proceed to describe it with reference to the drawings.

The barrel or cylinder A is made of sheet-iron, or of wood, or of any other suitable material, and it is provided with a cover, B, which fits nicely in its top. The bottom edge of the cylinder is strengthened by a rim, C, of cast-iron or other suitable material, and the rim is secured to the inside of the barrel, as clearly shown in Fig. 1 of the drawings. The lower portion of said rim is flaring down toward the center of the barrel, so that the ashes slide down over it and collect in the middle.

A bridge, D, which extends across the rim C, and which may be cast out of one piece with the same, forms the socket for the pivot $a$, on which the handle E oscillates. This handle extends through a slot in the side of barrel, so that it can be conveniently operated, and it is provided on its upper surface opposite the pivot $a$ with a square projection, $b$, which, for the sake of lightness, may be cut out and formed as represented in Fig. 1, and which may be cast with the handle and pivot of iron or any other suitable material. The projection $b$ fits into a corresponding socket, $c$, in the center of the sieve F, said socket being provided with a conical cap, $d$, whereby the coal and ashes are thrown on the perforated portion of the bottom of sieve.

The sieve F is made in the form of a cylinder corresponding to the barrel A, and fitting into the same quite easily, and it is provided with two handles, $e$, for the purpose of lifting it out or putting it in, as may be desired. Its bottom is made of a series of rings, $f$, of wire supported by and fastened to a series of radial bars, $g$, as clearly shown in Fig. 2 of the drawings; or it may be made in any other desirable manner. When the sieve is placed on the projection $c$ of the handle, its lower edge nearly touches the upper edge of the flaring rim C, so that said rim forms a guide for the sieve when the same, together with the handle, is put in motion.

The operation is as follows: The sieve F is placed into the barrel A and the coal and ashes are thrown in. The cover B is now put on and an oscillating motion is imparted to the sieve by the handle E. By this motion the ashes and small cinders are caused to drop through the meshes or perforations in the bottom of the sieve, and after the dust has subsided the sieve is taken out of the barrel, and the good coal can now easily be picked out and separated from the cinders.

Having thus fully described my invention, what I claim as new, and desire to secure by Letters Patent, is—

1. The arrangement of the square projection $b$ on one, and the pivot $a$ on the other, side of the handle E, in combination with the square socket $c$ in the center of the sieve F, and with the bridge D in the bottom of the barrel A, as and for the purpose specified.

2. The conical cap $d$ over the socket in the center of the sieve F, as and for the purpose described.

W. B. WADMAN.

Witnesses:
B. F. RICE,
WM. A. THOMPSON.